April 23, 1968
R. H. THOMPSON
3,378,986
SEALING APPARATUS
Filed April 12, 1965
3 Sheets-Sheet 1
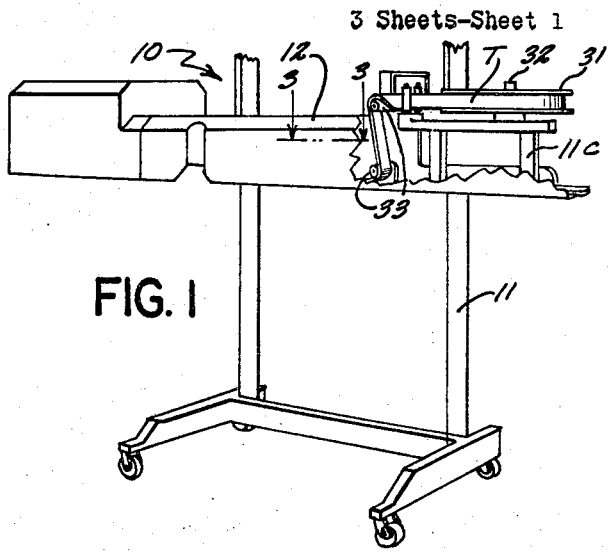
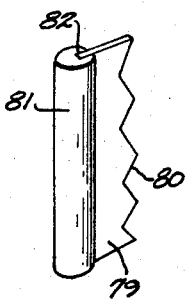
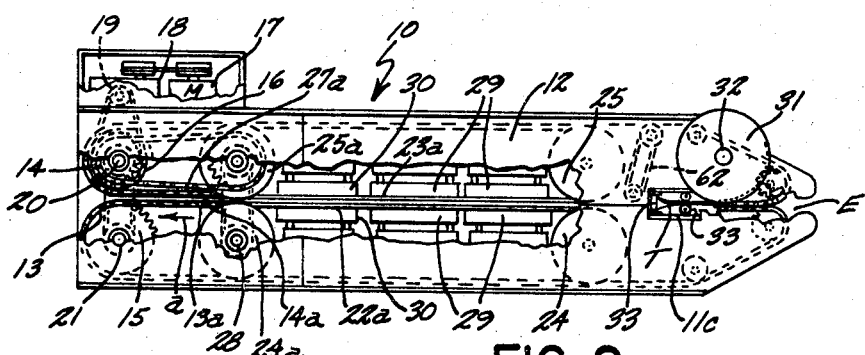
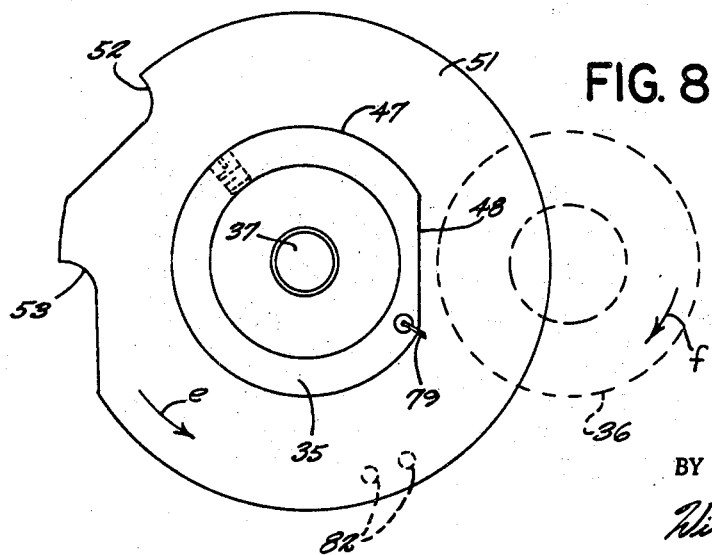
INVENTOR.
RICHARD H. THOMPSON
BY
Williamson & Palmatier
ATTORNEYS

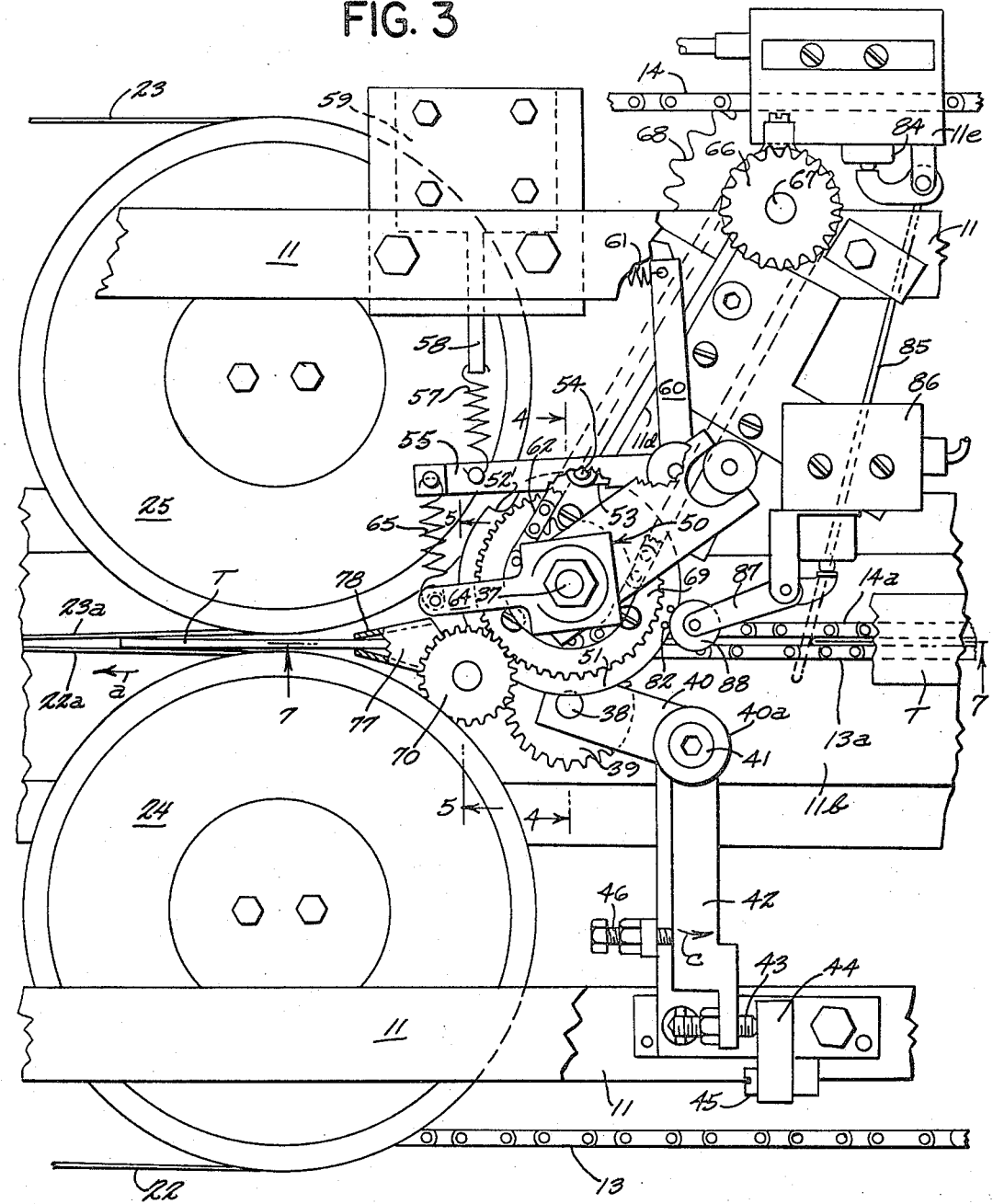

April 23, 1968     R. H. THOMPSON     3,378,986
SEALING APPARATUS

Filed April 12, 1965     3 Sheets-Sheet 3

INVENTOR.
RICHARD H. THOMPSON
BY
*Williamson & Palmatier*
ATTORNEYS

United States Patent Office 3,378,986
Patented Apr. 23, 1968

3,378,986
SEALING APPARATUS
Richard H. Thompson, New Richmond, Wis., assignor to Doughboy Industries, Inc., New Richmond, Wis., a corporation of Wisconsin
Filed Apr. 12, 1965, Ser. No. 448,583
12 Claims. (Cl. 53—76)

ABSTRACT OF THE DISCLOSURE

A bag closing and tape applying machine conveying a bag; tape feeding rollers initially applying the tape to the bag top and releasing the tape and bag top as the tape and bag top are sealed and moved by the sealing bands during sealing.

---

This invention relates to apparatus for closing the top of a bag by heat sealing and more particularly relates to apparatus for applying a sealing tape to the closed end of a bag for forming a heat sealed closure for the bag.

Conventionally the opposite front and rear walls of a filled bag are pressed together and then heat sealed adjacent their upper edges so as to close the top end of the bag. Oftentimes however, the nature of the material in the bag is accompanied by a good deal of dust which coats the entire inner surface of the bag walls, or is of some other nature as to adversely affect the inner surfaces of the bag walls as to make the sealing of the front and rear walls of the bag together at the upper edges virtually impossible because of contaminates or foreign matter in the area of the closure.

With these comments in mind, it is to the elemination of these and other disadvantages in the closing of a filled bag to which the present invention is directed, together with the inclusion herein of other novel and desirable features.

An object of the invention is to provide a new and improved tape feed apparatus of simple and inexpensive construction and operation for applying a tape over the top edge portions of the front and rear walls of a bag for effecting a heat sealed closure of the bag.

Another object of the invention is the provision of a novel apparatus for producing intermittent feeding and application of a tape to the top closure portion of a moving filled bag in a manner to facilitate heat sealing the bag closed and assuring that the entire upper closure portion of the bag is closed.

Another object of the invention is to provide an improved and novel apparatus for effectively wrapping a sealing tape around the top closure portion of a bag to be heat closed by heat sealing and essentially measure the width of the bag so as to apply a sufficient length of tape as to entirely close the upper edge portions of the bag by heat sealing.

A further object of the invention is to provide a new and novel apparatus controlling the tape being applied to the tops of bags all during the cycle of operation, by a feeding mechanism gripping the free end of the tape so as to start the tape instantaneously when a bag is presented, and then as the tape is moved by propelling rollers, the feeding mechanism releases the tape until the tape is to be cut and stopped at completion of a bag, at which time the feeding mechanism again grips and controls the tape at standstill until another bag is presented.

A still further object of the invention is to provide a new apparatus controlling the tape being applied to bag tops for heat sealing as to prevent stretching or other deformation of the tape during heating or sealing so as to avoid any change in the relation between the tape and the bag as the tape and seal cools.

These and other objects and advantages of the invention will more fully appear from the following description made in connection with the accompanying drawings, wherein like reference characters refer to the same or similar parts throughout the several views, and in which:

FIG. 1 is a perspective view of a sealing machine as a whole, with certain portions of the general enclosure broken away for illustrating some details of the present invention.

FIG. 2 is a top plan view of the machine as a whole with portions of the housing broken away for showing some details of the sealing machine in general.

FIG. 3 is a greatly enlarged top plan view of the tape applying mechanism as viewed within the housing as indicated substantially at 3—3 in FIG. 1.

FIG. 8 is an enlarged detail view taken approximately at 8—8 in FIG. 7, with certain of the parts deleted for clarity of detail and illustrating primarily, the orientation relationship between the lock wheel and the feed rollers during the mid cycle dwell of this feed mechanism.

FIG. 9 is a greatly enlarged perspective view of the tape severing blade and its mounting which is inserted in one of the feed rollers for controlling the tape.

Figure 4:
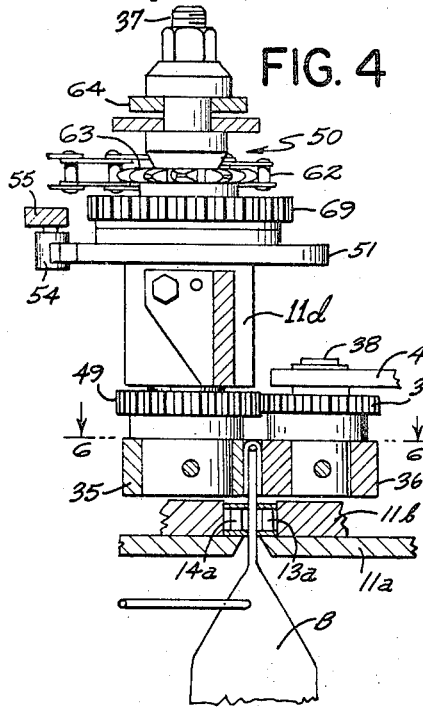
FIG. 4 is a detail section view taken on an upright plane substantially as indicated at 4—4 in FIG. 3.

One form of the present invention is shown in the drawings and is described herein. The sealing machine is indicated in general by numeral 10 and includes a frame structure 11, and a housing 12 which generally encloses a substantial portoin of the working mechanisms hereinafter described.

In general, the sealing machine 10 is well illustrated in FIG. 2 wherein a pair of elongate endless conveyor chains 13 and 14 confront each other along linear conveyor runs 13a and 14a extending substantially the full length of the housing for conveying the upper portions of bags B therethrough. The conveyor chains 13 and 14 are trained around sprockets 15 and 16 respectively. The chains are driven from a motor 17 which drives through a gear mechanism 18 and a drive chain 19 to a sprocket connected on the shaft 20 upon which the sprocket 16 is affixed. Meshed gearing connects the shaft 20 to the shaft 21 which drives the sprocket 15 and chain 13 so that the chains 13 and 14 both travel along their confronting linear runs 13a and 14a in the direction of the arrows a.

A pair of endless flexible heat transmitting sealing bands 22 and 23 have linear confronting runs 22a and 23a disposed in superposed relation with respect to the corresponding confronting conveyor runs 13a and 14a of the conveyor chains, and the runs 22a and 23a of the bands engage and apply sealing heat to the bag tops moving along the conveyor chains. The bands 22 and 23 are trained around drums 24, 24a, 25 and 25a which are journaled on suitable rotary shafts connected to the frame structure 11.

The band-mounting drums 24a and 25a drive the bands 22 and 23 respectively. The shaft 26 which drives and mounts drum 25a has a sprocket 27 thereon which is driven by chain 27a from sprocket 27b affixed on the shaft 20.

Meshed gearing interconnects the shaft 26 and shaft 28 for applying power to the drum 24a and thereby moving both of the bands 22 and 23 in the direction of arrows a which is identical to the direction of the conveyor chains runs 13a and 14a and the bands 22 and 23 move at a speed identical to the speed of the conveyor chains so that as the bag tops progress along the conveyor chains and along the runs 22a and 23a of the bands, there is no relative movement between the bands and the bag tops during sealing.

Sealing heat is provided to the linear runs 22a and 23a of the bands by heating bars 29 which confront and may engage the linear runs 22a and 23a of the sealing bands. The heating bars 29 maybe heated by electric resistance heaters.

The bands 22 and 23 are also cooled along the linear runs 22a and 23a for setting the heat sealed material in the bags after sealing has been effected, and such cooling is provided by cooling bars 30 through which cooling fluid maybe moved. All of the heating and cooling bars 29 and 30 are mounted on the frame and may be adjustable in order to permit varying spacing betwen the confrtoning linear runs 22a and 23a of the sealing bands.

It will be noted that the linear confronting runs 13a and 14a of the conveyor chains are supported by frame plates 11a and are guided along guide plates 11b so as to tightly clamp and retain the bag tops as the proper location in the machine as the bags travel along with the conveyor chain. It will be understood that the bag tops are moved into engagement with the conveyor chains 13 and 14 at the access end E thereof as seen in FIG. 2.

The tape feeding and control apparatus includes a tape supply which in the form shown may be a spool 31 removably mounted on a suitable spindle 32 attached to a portion 11c of the frame structure. The tape T is of heat sealable material such as polyethylene or other similar thermoplastic material. Suitable guides 33 are provided for one tape T to supply the tape downwardly into proximity with the bag tops moving through the machine and carried by the conveyor chains. The tape T is longitudinally folded with both sides extending downwardly by one or more formers 34 as the tape approaches the rotary feed rollers 35 and 36 which are affixed to and carried on rotary shafts 37 and 38 respectively. The feed roller 36 is constructed of rubber with a relatively smooth peripheral surface for purposes hereinafter more fully described and is driven by a pinion gear 39 which is also affixed on the roller mounting shaft 38 which is mounted in a normally stationary, but swingable mounting arm 40 which is connected by collar 40a to a mounting post 41. Another control arm 42 affixed to the collar 40a carries a threaded set screw 43, the end of which bears against a swingable toggle bar 44 vertically swingably mounted on the frame by means of a mounting screw 45 so that the toggle 44 may be swung out of the way with respect to the set screw 43 to permit the arm 42 to be swung in a direction of arrow c, thereby permitting the rubber roller 36 to be swung away from the feed roller 35 to be replaced. Another set screw 46 is suitably mounted on the frame and bears against the arm 42 to adjustably control the position of the arm 40 and the rubber roller 36.

The tape feeding roller 35 is constructed of steel and has a first peripheral surface portion 47 which is knurled so as to tightly engage and grip the tape T in cooperation with roller 36. A second portion 48 of the roll periphery is flat so as to confront the roller 36 in spaced relation as seen in FIG. 8 and allow the tape T to move between the feed rollers 35 and 36 during a portion of each cycle of operation as more fully hereinafter described.

Figure 6:
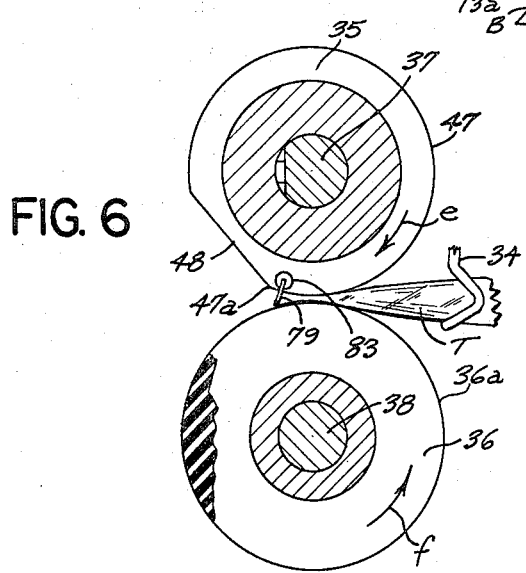
FIG. 6 is an enlarged detail view taken on a plane as indicated substantially at 6—6 in FIG. 4 and illustrating the condition of the feed rollers when the cycle of applying tape to a bag has been completed and the rollers are stationary.

The mounting shaft 37 to which the feed roller 35 is affixed, also carries a pinion gear 49 which is meshed with the pinion gear 39 and is in driving relation thereto. The shaft 37 extends through a bearing mounted in a portion 11d of the frame structure, and extends upwardly beyond said frame structure to a clutch mechanism 50 controlling rotation of the shaft 37. Shaft 37 also has affixed thereto a rotary lock wheel 51 which revolves whenever the shaft 37 revolves. The lock wheel 51 has a pair of notches 52 and 53 formed in the outer periphery thereof to releasably and ultimately receive a stop roller 54 therein so as to stop the lock wheel 51 and the feed roller 35 at predetermined orientations in relation to the roller 36 and tape T. The roller 54 will seat in the notch 52 at the end of a cycle of operation so as to orient the feed roller 35 in relation to the rubber roller 36 and tape T in the orientation as seen in FIG. 6; and the stop roller 54 will seat in the mid cycle notch 53 during an intermediate stage of each cycle of operation so as to orient the lock wheel 51 and feed roller 35 in the orientation illustrated in FIGS. 3 and 8 relative to the tape T and the feed roller 36. The stop roller 54 is journaled on a rigid link 55 which is swingably mounted on a pin 56 affixed to the portion 11d of the frame structure. The rigid link 55 is connected by spring 57 to the armature 58 of solenoid 59 which operates to move the link 55 and pull the cam roller out of engagement with the lock wheel 51. A link 60 is rigidly connected with the link 55 and swings therewith about pin 56 for mounting the return spring 61 which is also anchored to the frame 11 so as to seat the stop roller 54 in the lock wheel notches when the solenoid 59 is de-energized.

Rotary power is supplied to the shaft 37 from a roller chain 62 trained around sprocket 63 which is coaxial of shaft 37 but rotatable with respect thereto. The sprocket 63 applies rotary power to the input of clutch 50, and when the control lever 64 of the clutch is swung in the direction of arrow d by spring 65 which connects the lever 64 to the link 55, the clutch transmits rotary power from the sprocket 63 to the shaft 37 for driving the lock wheel 51 and the feed rollers 35 and 36.

The chain 62 is driven continuously from a sprocket 66 which is affixed to a shaft 67 to which is also affixed another sprocket 68 which is meshed with and continuously driven by conveyor chain 14 at its outer run as seen in FIGS. 2 and 3.

It will therefore be seen that when the solenoid 59 is de-energized, the stop roller 54, engaging the lock wheel 51 at one of the notches 52 or 53 thereof retains the lock wheel and the feed rollers 35 and 36 to prevent rotation thereof. When the solenoid 59 is energized, the armature 58 thereof is retracted so as to swing the stop roller 54 out of the lock wheel notch and simultaneously the link 55 acts through spring 65 to swing the clutch operating arm 64 in the direction of arrow d, thereby causing the clutch 50 to apply rotary power to the shaft 37 which revolves the lock wheel 51 and causes the feed rollers 35 and 36 to also revolve and produce feeding of the tape T.

Figure 7:
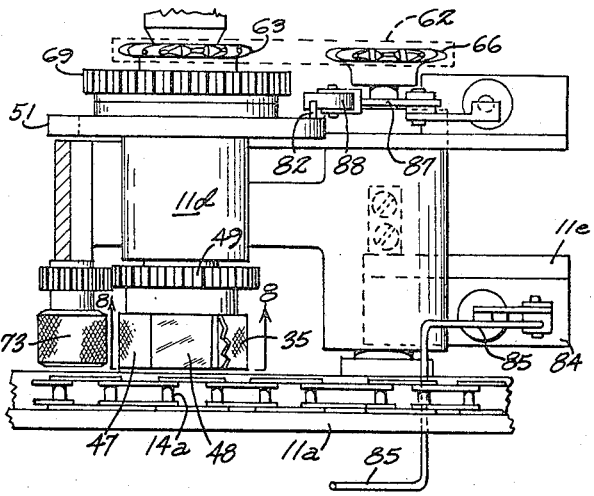
FIG. 7 is a detail section view taken on an upright plane as indicated substantially at 7—7 in FIG. 3.
Figure 5:
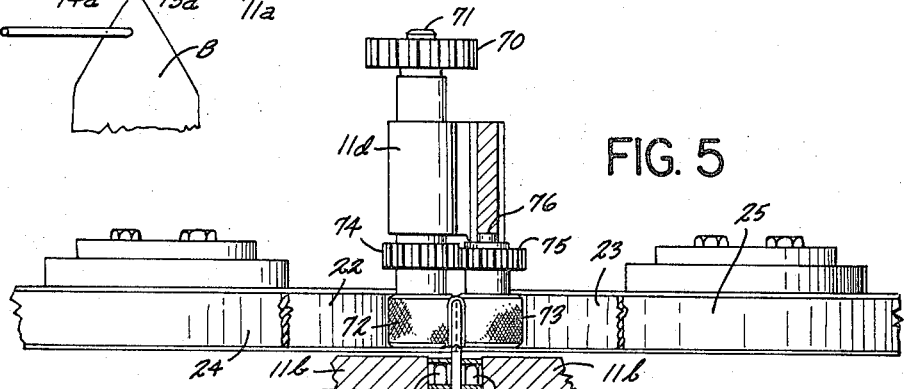
FIG. 5 is a detail section view taken on an upright plane, substantially as illustrated at 5—5 in FIG. 3.

The continuously rotating sprocket 63 is affixed to a pinion gear 69 which is continuously meshed with the pinion gear 70 on shaft 71 to continuously apply rotary motion to continuously operating propelling rollers 72 and 73. The shaft 71 has a second pinion gear 74 affixed thereon which continuously meshed and continuously driving pinion gear 75 which is affixed on the driving shaft 76 which also affixedly mounts and drives the propelling roller 73. Shafts 71 and 76 are journaled in bearings on the portion 11d of the frame structure, and as seen in FIG. 7, the propelling rollers are mounted closely adjacent the feed rollers 35 and 36 to immediately receive the free end of the tape supply from the feed rollers 35 and 36 and before these feed rollers 35 and 36 have revolved through a complete revolution. It will also be noted that the propelling rollers are mounted in closely spaced relation with the sealing band-mounting drums 24 and 25 so that the free end of the tape is propelled directly to the sealing bands to be confined therebetween as the tape and the top edge portion of a bag leave and are propelled from the rollers 72 and 73.

A stationary tape holddown and guide 77 has converging sides 78 to receive and guide the tape and bag tops as the same are propelled from the rollers 72 and 73, thereby guiding the tape and controlling the folded shape thereof for as much of the distance as is possible between the propelling rollers 72 and 73 and the point at which the tape and bag tops are engaged and clamped by the bands 22 and 23.

Means are provided for severing the tape T at the end of a cycle of operation and when a bag B has departed the tape applying station at the rollers 35 and 36 and propelling rollers 72 and 73, and such tape severing means includes a steel blade 79 having a saw tooth sharpened edge 80. The blade is embedded in a nylon mounting plug 81 and in a longitudinally extending diametric slot 82 therein. The plug 81 and blade 79 are inserted in a key hole shaped slot aperture 83 in the rotary feed wheel 35 so as to project outwardly from the portion 47 of the roller periphery and immediately adjacent the leading edge 47a on the roller periphery which separates the flat portion 48 from the rounded tape driving portion 47. The blade 79 protrudes from the periphery of the roller 35 sufficiently as to project into the peripheral surface of the rubber feed roller 36 as the blade 79 revolves with the roller 35. The emitting of the sharpened edge of the blade 79 in the rubber roller 36 is a primary reason for constructing the roller 36 of rubber and is also a primary reason for mounting the roller 36 as described so as to make the replacement of the roller possible and practical. Periodically, the roller 36 will be merely swung away slightly from the roller 35 as to permit the roller 36 to be turned slightly, thereby moving a different portion of the roller periphery into confronting engagement with the blade 79.

Means are provided for controlling rotation of the feed rollers 35 and 36 and the knife 79 so as to produce feeding of the tape in relation to a bag which is sensed to moving along the conveyor chains 13 and 14. In the form shown, such control means includes a microswitch 84 connected by a frame plate 11e to the frame of the machine and having an elongate swinging feeler rod 85 extending beneath the chain supporting frame plate 11a with the extreme end thereof disposed below the conveying runs 13a and 14a of the chains and adjacent the feed rollers 35 and 36 as seen in FIGS. 3 and 7. The feeling rod 85 senses the location of the bag as it travels along the linear runs 13a and 14a of the conveyor so that the switch 84 is operated when a bag approaches the tape applying station and the switch 84 operates back to a normal condition when the bag departs the taping station and the feeler disengages from the bag.

A second microswitch 86 is operated by a swingable arm 87 with a sensing roller 88 on the extreme end thereof. The roller 88 is disposed immediately adjacent the lock wheel 51 to sense the rotational orientation of the lock wheel 51 by engaging the upstanding rigid operating pins 82 which are affixed on the lock wheel 51 adjacent the periphery thereof. It will be seen that the pins 82 engage and move the roller 88 so as to operate switch 86 when the mid cycle notch receives the top roller 54, thereby operating the microswitch 86 when the feed roller 35 has rotated to the position illustrated in FIG. 8 in relation to feed roller 36, thereby releasing the tape T.

Figure 10:
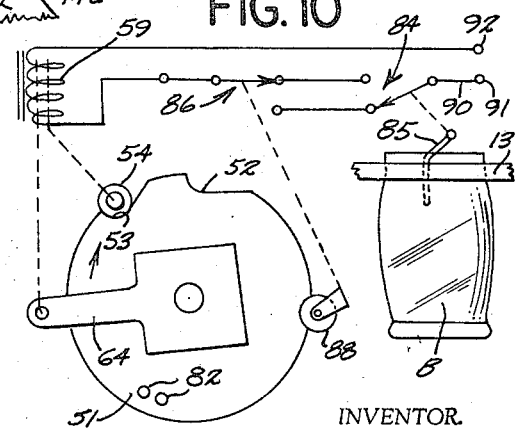
FIG. 10 is a diagrammatic sketch showing the electrical circuit diagram related to the present invention and also showing the mechanical relationships of certain of the parts thereto.

It will be seen in FIG. 10 that each of the microswitches 84 and 86 is a single pole, double throw switch, and that these switches 84 and 86 are connected in series relation in the conductor 90 between power terminal 91 and one end of the winding of solenoid 59. The other end of the winding of solenoid 59 is connected to power terminal 92. The terminals 91 and 92 are connected to a suitable source of electric power adequate to operate the solenoid 59, such as 110 volts A.C.

In the operation, it will be recognized that at the beginning and end of each operational cycle of the tape applying mechanism, the feed rollers 35 and 36 assume the relative orientation illustrated in FIG. 6, and the stop roller 54 is seated in the home notch 52 of the lock wheel 51. The confronting peripheral portions 47 of feed roller 35 and 36a of roller 36 engage and grip the tape which is folded downwardly in the manner illustrated in FIG. 4, but without the bag therein.

Even though the feed rollers 35 and 36 are temporarily stationary, between operational cycles, the conveyor chains 13 and 14 are being continuously driven, the sealing bands 22 and 23 are also being continuously driven, and the propelling rollers 72 and 73 are also being continuously driven.

When a bag with an open unsealed top is received at the end E of the machine 10, the conveyor chains engage and carry the top of the bag between the runs 13a and 14a in substantially flat condition. When the feeler 85 is engaged by the bag moving along the conveyor, the microswitch 84 operates so as to apply the power from terminals 91 and 92 through the microswitch 86 and to the solenoid 59 which immediately operates its armature.

When the armature 58 of the solenoid is retracted, the link 55 is swung so as to remove the stop roller 54 from the home notch 53 in the lock wheel, and simultaneously, the clutch operating arm 64 is swung in the direction of arrow d as to operate the clutch and cause rotary power to be applied from the sprocket 63 to the shaft 37, whereupon the lock wheel 51 and the feed rollers 35 and 36 immediately start to revolve. Preferably the feed rollers 35 and 36 will start their operation when the bag top is approximately a half an inch from the free end of the tape T which is confined between the feed rollers 35 and 36 and adjacent the blade 79. The rotary power applied to shaft 37 produces rotation of the lock wheel and feed roller 35 in the direction of arrows e and, of course the feed roller 36 will revolve in the opposite direction as indicated by arrow f.

As the feed rollers 35 and 36 commence revolving, the bag top, which has moved into the downwardly folded sides of the tape T passes with the tape between the feed rollers 35 and 36 which supply the free end of the tape T to the propelling rollers 72 and 73, between which the downwardly folded tape T and bag top also pass. The circumferential length of the portion 47 of the periphery of feed roll 35 is substantially greater than the lineal distance between the feed rollers 35 and 36 and the propelling rollers 72 and 73, thereby the tape is positively propelled by the feed rollers 35 and 36 until it is received and propelled by the rollers 72 and 73. After the tape and bag top are received and gripped by the propelling rollers 72 and 73, the flat portion 48 of the periphery of feed roller 35 turns into confronting relation with the feed roller 36 so as to release the bag top and tape, and at this instant, the feed rollers 35 and 36 are stopped and are retained during substantially the entire remainder of the operational cycle of applying tape to the bag passing the taping station.

The stopping of the feed roll is effected by operation of the pins 82 engaging the cam roller 88 to operate the microswitch 86 which de-energizes the solenoid 59, thereby permitting the top roller 54 to engage the periphery of the lock wheel 51 and to move into the mid cycle notch 53 as this notch turns with the lock wheel to the stop roller 54. The tape applying apparatus is illustrated in this stop, mid cycle condition in FIGS. 3, 7 and 8, and it will be noted that the end of the tape T has already passed through the guide 77 and between the drums 24 and 25 and into the space between the linear runs 22a and 23a of the sealing bands.

The tape applying mechanism remains in the condition shown all during the passage of the bag along the taping station. During this condition, the tape T is being pulled along from the supply spool 31 by the propelling rollers 72 and 73 and the tape is being supplied with the bag top at a rate identical to the movement of the bag top which is controlled by the conveyor chains 13 and 14. The tape is supplied to the space between the sealing bands in a relaxed condition so that when the sealing heat is applied through the bands to the tape and to the upper edge portions of the bag covered by the tape, the tape will be uniformly applied to the bag without any distortion and without any subsequent distortion as the fused thermoplastic material cools.

As the bag B departs the taping station, the feeling rod 85 disengages the bag and the microswitch 84 returns to its normal condition so as to again close the circuit between the terminal 91 and the solenoid, thereby again energizing the solenoid causing the armature 58 to retract so as to remove the stop roller 54 from the mid cycle notch 53 of the lock wheel and as to again operate the clutch engaging arm 64. The rotary power is thereby again applied to the shaft 37 causing the lock wheel 51 and the feed rollers 35 and 36 to revolve from the position illustrated in FIG. 8. It will be understood that the edge of the bag to which the tape has been applied, has already moved past the blade 79 as the feed roll 35 again starts to revolve. As the feed roll 35 revolves, the blade 79 swings into engagement with the tape at a desired distance from the edge of the bag and the blade 79 passes through the tape T and into the periphery of the rubber feed roller 36 so as to release the bag and tape applied thereon from the supply of tape connected to the spool 31. As the tape is severed, it will be noted that the tape is being gripped and controlled between the feed rollers 35 and 36 and the free end of the tape is thereby ready for an instantaneous start again at the desired location and timing when another bag approaches.

As the lock wheel 51 starts to revolve again, the pins 82 move away from the camming roller 88 so as to again permit the microswitch 86 to return to its normal position, thereby again opening the circuit between terminal 91 and the solenoid winding, thereby deenergizing the solenoid and allowing the stop roller 54 to move into the home notch 53 of the lock wheel and also allowing the clutch operating arm 64 to return to its normal position to thereby disengage the clutch and remove the rotary power from the shaft 37 and from the feed rollers 35 and 36. The feed rollers will thereupon stop in the position substantially illustrated in FIG. 6 wherein the tape T is again gripped and controlled by the peripheries of the feed rollers 35 and 36.

It will be seen that this apparatus provides continuing control over the tape being applied for heat sealing to the open top of a bag so that the tape is started at the proper instant as a bag approaches the tape applying station and the tape is pulled continuingly by the propelling rollers and independently of the sealing bands so that the tape is applied to the bag at the time of sealing in a relaxed and nondistorted condition so as to form a desired seal with the bag.

It will, of course, be understood that various changes may be made in the form, details, arrangements and proportions of the various parts without departing from the scope of the invention.

I claim:

1. A machine for closing bag tops onto which sealing tapes with downwardly folded sides are to be applied, the combination of a frame, conveyor means on the frame and sequentially carrying unsealed bags each with the upper edge portions of the opposite bag walls engaging each other in substantially flat and confronting relation, feeding means on the frame defining a tape applying station and alternately applying such a tape onto the confronting upper edge portions of the opposite bag walls moving along the station and releasing the tape to permit the tape to be independently moved and including a tape severing device, control means sensing location of such bags on said conveyor means and effecting intermittent operation of said feeding means in response to bags moving along said tape applying station, and also effecting periodic operation of said severing device in response to sensing of a bag passing from said tape applying station, and means receiving the upper edge portions of the bag top with the longitudinally folded sealing tape applied thereon and pulling the tape along with the bag top and also appling sealing heat to the tape and edge portions to effect sealing thereof.

2. A machine for applying and sealing longitudinally folded heat sealable tapes downwardly over the open tops of bags, said machine comprising a frame, conveyor means on the frame and sequentially carrying unsealed bags each with the tops closed and substantially flat, means on the frame providing a supply of tape, gripping and sealing means receiving the upper edge portions of the bag top with the longitudinally folded sealing tape applied thereon and applying sealing heat to the tape and edge portions to effect sealing thereof, said gripping and sealing means also continuously pulling the tape received with the bag top, intermittently operable feeding means on the frame and defining a taping station, said feeding means releasably gripping the free end of the tape supply to apply the tape onto the bag top and move the tape along with the bag, control means sensing location of the bags on the conveyor means and responding to approach of a bag to the taping station to effect operation of said feeding means to supply the free end of the tape with the bag top to the gripping and sealing means and subsequently to release the tape and permit the tape to be pulled by said gripping and sealing means, said control means also operating said feeding means to reengage, grip, and stop the tape as the bag departs the taping station, and a tape severing means connecting with said feeding means and operating in conjunction therewith to sever the tape connected to a departing bag.

3. The tape applying and sealing machine according to claim 2 wherein said feeding means includes a pair of rollers receiving and gripping the tape therebetween, the periphery of one of said rollers being movable away from the other of said rollers to release the tape and permit movement thereof between the rollers.

4. A machine for applying and sealing longitudinally folded heat sealable tapes downwardly over the open tops of bags, said machine comprising a frame, conveyor means on the frame and sequentially carrying unsealed bags each with the tops closed and substantially flat, means on the frame providing a supply of tape, gripping and sealing means receiving the upper edge portions of the bag top with the longitudinally folded sealing tape applied thereon and applying sealing heat to the tape and edge portions to effect sealing thereof, said gripping and sealing means also continuously pulling the tape received with the bag top, intermittently operable feeding means on the frame and defining a taping station, said feeding means having operable mechanism alternately gripping and releasing the tape, said mechanism gripping the free end of the tape supply to move a length of tape with a bag top to said gripping and sealing means, said mechanism releasing the tape to permit the tape to be pulled by said gripping and sealing means, control means sensing location of the bags on the conveyor means and responding to approach of a bag to the taping station to cause said operable mechanism to first move the tape with the bag to the gripping and sealing means and then release the tape to allow the tape to be pulled with the bag, said control means stopping said operable mechanism when the tape is released and while the bag is at the taping station, said control means also causing the operable mechanism of the feeding means to re-engage, grip, and stop the tape as the bag departs from the taping station, and a tape severing means connected with said feeding means and operating in conjunction therewith to sever the tape supplied from said feeding means and connected to a departing bag.

5. A machine for applying and sealing longitudinally folded heat sealable tapes downwardly over the open tops of bags, said machine comprising a frame, conveyor means on the frame and sequentially carrying unsealed bags each with the tops closed and substantially flat, means on the frame providing a supply of tape, gripping and sealing means on the frame receiving the upper edge portions of the bag top with the longitudinally folded sealing tape applied thereon and applying sealing heat to the tape and edge portions to effect sealing thereof, said gripping and sealing means also continuously pulling the tape received with the bag top, intermittently operable feeding means on the frame and having operable mechanism alternately gripping and releasing the tape, said mechanism gripping the free end of the tape supply to apply the tape onto the bag top and to move a length of tape with a bag top to said gripping and sealing means, said mechanism releasing the tape to permit the tape to be pulled by said gripping and sealing means, means for stopping the feeding means during gripping of the tape by said operable mechanism, and tape severing means connected with said feeding means and operating in conjunction therewith to sever the tape supplied from said feeding means to facilitate stopping of the feeding means with the free end of the tape supply gripped in said operable mechanism.

6. The tape applying and sealing machine of claim 5 wherein said operable mechanism of the feeding means including first and second cooperating driving rollers having confronting peripheries receiving the tape therebetween, said roller peripheries having first peripheral portions respectively contiguous with each other in tape gripping and driving relation, and also having second peripheral portions respectively spaced from each other in tape releasing relation, said rollers being spaced from said gripping and sealing means a distance less than the circumferential first peripheral portions of said rollers.

7. The tape applying and sealing machine of claim 6 wherein said tape severing means includes a tape cutting blade, one of said rollers having means mounting said blade in outwardly projecting relation to the periphery thereof, the other of said rollers having means at the periphery thereof releasably receiving said blade therein as the blade revolves with the roller and severs the tape.

8. The tape applying and sealing machine of claim 7 wherein said blade projects from the first peripheral portion of the roller, whereby said rollers grip the tape as the blade severs the tape.

9. The tape applying and sealing machine according to claim 6 wherein the second peripheral portion of said first roller is substantially flat, and the first and second peripheral portions of the second roller being contoured and rounded substantially similarly with respect to each other, said rollers releasing the tape when said substantially flat second peripheral portion of the first roller confronts the periphery of the second roller to permit said gripping and sealing means to freely pull the tape therebetween.

10. The tape applying and sealing machine of claim 9 wherein said cooperating driving rollers revolve in predetermined directions of rotation to cooperatively propel the tape toward said gripping and sealing means, said first driving roller having a linear edge on the periphery thereof between said first and second peripheral portions, said edge being in circumferentially leading relation with said first peripheral portion relative to the direction of rotation, said tape severing means including a blade, means mounting said tape severing blade at the periphery of said first driving roller and in the first peripheral portion thereof and adjacent said linear edge, said second driving roller having means at the periphery thereof releasably receiving said blade therein as the blade revolves with the rollers in severing the tape, whereby said first peripheral portions of said rollers grip the tape as the tape is being severed.

11. A machine for applying and sealing longitudinally folded heat sealable tapes downwardly over the open tops of bags, said machine comprising a frame, conveyor means on the frame and sequentially carrying unsealed bags each with the tops closed and substantially flat, means on the frame providing a supply of heat sealable tape, intermittently operable feeding means on the frame adjacent said conveyor means and having an operable mechanism alternately gripping and releasing the tape, said mechanism gripping the free end of the tape to apply the tape onto the bag top moving along the conveyor means and to move a length of tape with the bag top, said mechanism releasing the tape to permit the tape to be independently moved with the bag top, means for stopping the feeding means during gripping of the tape by said operable mechanism, tape severing means connected with said feeding means and operating in conjunction therewith to sever the tapes supplied from said feeding means to facilitate stopping of the feeding means with the free end of the tape supply gripped in said operable mechanism, a pair of continuously driven propelling rollers on the frame and spaced along the conveyor means from said feeding means, said propelling rollers cooperatively receiving and gripping the upper edge portions of the bag top with the longitudinally folded sealing tape applied thereon, said propelling rollers continuously moving the tape received from said feeding means at a regulated rate corresponding to movement of the bags on said conveyor means, and sealing means on the frame and including a pair of rotary drums opposite each other and having confronting peripheries cooperatively receiving the upper edge portions of the bag top with the longitudinally folded sealing tape applied thereon and at a constant rate from said propelling rollers, said cooperating drums having diameters very substantially exceeding the diameters of said propelling rollers and being in closely spaced relation with said propelling rollers, said sealing means applying sealing heat to the tape and bag top and sealing the same together, said propelling rollers supplying the tape uniformly along with the bag top and at a corresponding speed so as to prevent distortion while the tape-softening sealing heat is applied.

12. The tape applying and sealing machine of claim 11 wherein said sealing means includes a pair of elongate, endless, flexible, heat transmitting sealing bands having cooperating and confronting linear runs extending along said conveyor means to receive said bag tops with the tape applied thereon, said bands being trained around said drums, and said sealing means having heaters applying sealing heat through said bands to the bag tops and tapes.

References Cited

UNITED STATES PATENTS

| 2,845,760 | 8/1958 | Hopkins et al. | 52—137 X |
| 2,978,852 | 4/1961 | Hopkins et al. | 53—137 |
| 3,097,461 | 7/1963 | Avril | 53—137 |

TRAVIS S. McGEHEE, *Primary Examiner.*